United States Patent [19]

Aronoff

[11] Patent Number: 4,774,458
[45] Date of Patent: Sep. 27, 1988

[54] MAGNETIC DEVICE

[76] Inventor: Leonard S. Aronoff, 16751 Tupper St., Sepulveda, Calif. 91343

[21] Appl. No.: 918,591

[22] Filed: Oct. 10, 1986

Related U.S. Application Data

[63] Continuation of Ser. No. 615,163, May 30, 1984.

[51] Int. Cl.$^4$ .......................... G01R 5/16; G01R 1/20
[52] U.S. Cl. .............................. 324/146; 324/140 D; 324/151 R; 324/207; 335/229
[58] Field of Search ............... 336/221, 214, 215, 178; 324/207, 144, 146, 151 R, 151 A, 140 D; 340/870.35, 870.31, 870.36; 335/228, 229

[56] References Cited

U.S. PATENT DOCUMENTS

| | | | |
|---|---|---|---|
| 2,836,773 | 5/1958 | Skrobisch | 324/146 |
| 3,428,867 | 2/1969 | Becker | 335/284 |
| 3,585,550 | 6/1971 | Dorsch | 335/284 |
| 3,891,922 | 6/1975 | Atzinger | 324/151 R |
| 4,222,021 | 9/1980 | Bunker | 335/296 |
| 4,302,720 | 11/1981 | Brill | 324/146 |

FOREIGN PATENT DOCUMENTS

| | | | |
|---|---|---|---|
| 1095939 | 12/1960 | Fed. Rep. of Germany | 324/144 |
| 1274805 | 8/1968 | Fed. Rep. of Germany | 324/208 |
| 2360845 | 6/1975 | Fed. Rep. of Germany | 324/146 |
| 2555774 | 5/1977 | Fed. Rep. of Germany | 324/145 |
| 2115012 | 10/1977 | Fed. Rep. of Germany | 324/146 |

OTHER PUBLICATIONS

Herrick: "Instruments and Measurements for Electronics", pp. 18-21, McGraw-Hill, 1972.
Reitz et al., "Foundations of Electromagnetic Theory", pp. 191-193, Addisson-Wesley, ca. 1965.

Primary Examiner—Reinhard J. Eisenzopf
Assistant Examiner—Jose M. Solis
Attorney, Agent, or Firm—Nilsson, Robbins, Dalgarn, Berliner, Carson & Wurst

[57] ABSTRACT

A first magnet is mounted for rotation near a cavity of a magnetizable body such that the first magnet has a null position influenced by magnetic interaction between said first magnet and at least two pole pieces of the magnetizable body. The magnetizable body has a core associated with a source of magnetic energy to induce magnetism within the core and the pole pieces and thereby alter the null position of the first magnet. Various embodiments of the invention include: analog meter mechanisms; actuators; transducers; proximity and position indicators; and other devices.

19 Claims, 6 Drawing Sheets

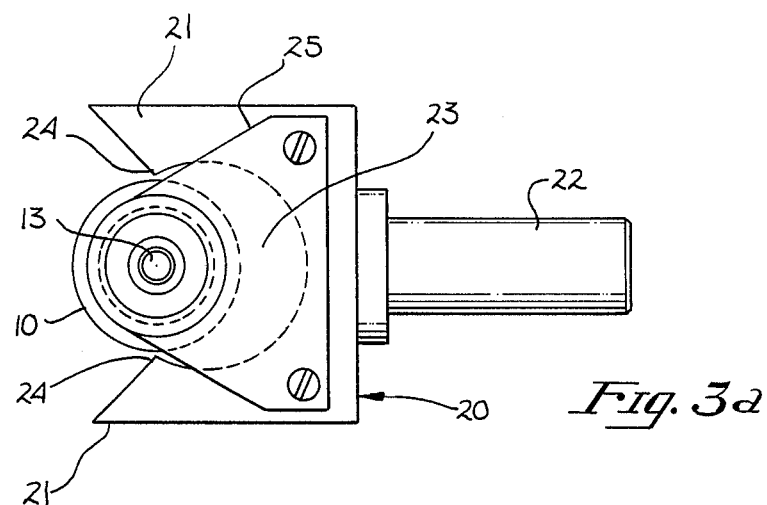
_Fig. 3a_
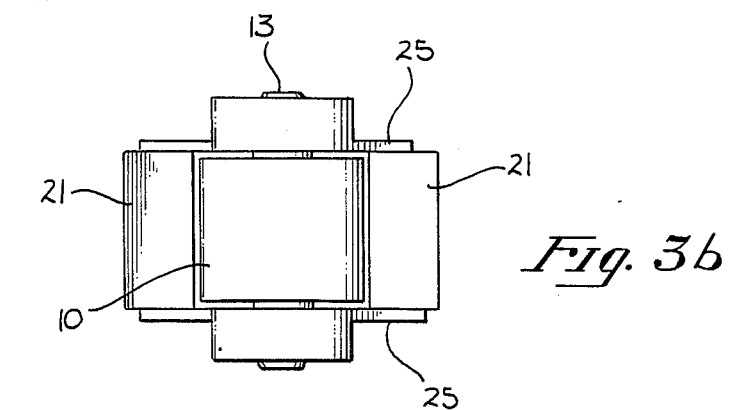
_Fig. 3b_
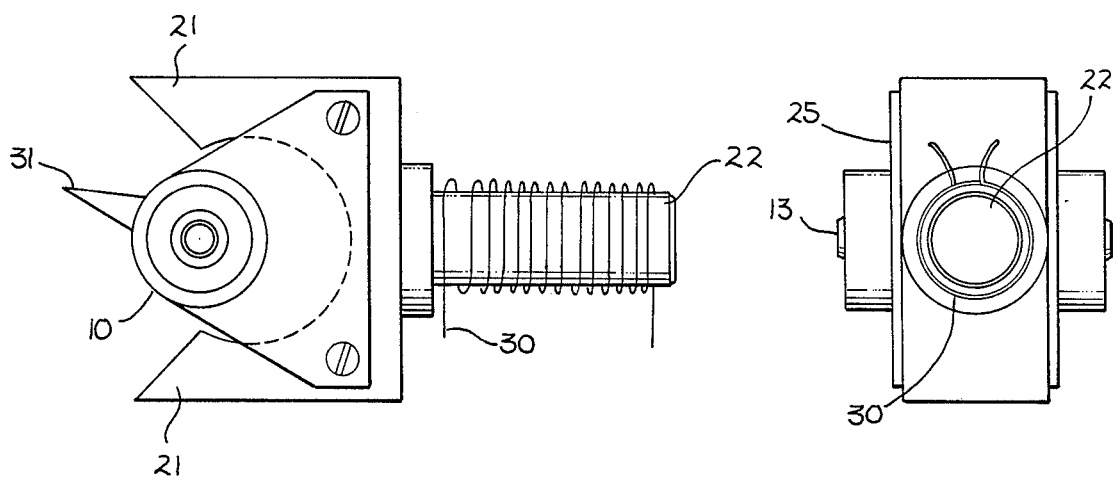
_Fig. 4a_     _Fig. 4b_

MAGNETIC DEVICE

This is a continuation of co-pending application Ser. No. 615,163 filed on May 30, 1984.

BACKGROUND OF THE INVENTION

1. Field of the Invention

This invention relates to electromagnetic conversion devices involving electromagnetic coupling. More particularly, this invention relates to electromagnetic actuators, transducers, measuring, indicating and monitoring devices.

2 Prior Art

Various electromagnetic conversion devices are described in the prior art, such as: the permanent-magnet, moving-coil (D'Arsonval) mechanism; the moving-magnet, fixed-coil mechanism; the moving-iron, fixed-coil mechanism, the moving-coil, fixed coil mechanism. The most pertinent involves the D'Arsonval movement. An exemplary description of the D'Arsonval movement is found in the Standard Handbook for Electrical Engineers, edited by Donald G. Fink and H. Wayne Beaty (11th Edition, 1978).

The D'Arsonval movement comprises a wound coil of wire ("coil") that is suspended between bearings in a magnetic field and is therefore free to rotate ("moving coil"). The magnetic field is produced by a permanent magnet which surrounds the moving coil. An air gap is maintained between the magnet pole pieces and the moving coil. Usually, some form of restraint such as a spring is attached to the moving coil. The D'Arsonval mechanism operates by having the current, which flows in the coil, react to the magnetic field that surrounds the movable coil and that reaction is counter-balanced by the force from the spring. The force on the moving coil, caused by the magnetic field about the coil from the electric current flowing through its conductors and the magnetic field of the gap, causes the coil to rotate to the point where the force on the coil due to the magnetic interaction is equal and opposite to the force on the coil from the spring.

While the D'Arsonval mechanism and the other aforementioned mechanisms have been widely accepeted, the springs required for their operation have caused various problems. In many applications, the output response of the mechanism should be proportional to the electrical input. In an ammeter, for example, the deflection of the wound coil should be proportional to the input current in the winding. Thus, the force associated with the spring should be a linear function of the displacement, but in fact it is not exactly linear because the spring coefficient is not totally linear over the range of the displacement. Thus, the output response of the D'Arsonoval mechanism is linear only for a limited angular displacement of the wound coil.

The metallic springs which are a part of the mechanisms identified above, are temperature sensitive in that the spring constant varies with temperature. Another disadvantage associated with the spring is the problem of overcoming hysteresis associated with the wound metallic member. Finally, it is simpler to calibrate a movement which does not require a spring.

SUMMARY OF THE INVENTION

The present invention provides an apparatus comprising a first magnet whose null position is determined by magnetic interaction between the first magnet and a magnetizable body. The null position is defined as the position of equilibrium of a movable magnet within a magnetic field. That is, it is the position of net zero force (including torques) applied to the moving element, the first magnet. The moving element of the present invention is a first magnet, which may be a permanent magnet or an electromagnet, which is free to rotate in or close to a cavity of a magnetizable body. The magnet typically moves by rotation about its axis, which is usually a shaft positioned perpendicular to the magnetic field created by the magnetizable body. The magnet reacts to a magnetic field which acts as the connecting link between the electrical and mechanical systems which are connected to the device claimed in the present invention. The magnetizable body has at least two pole pieces that define a region disposed between the pole pieces. This region is referred to as a "cavity".

The first magnet, which is positioned near the cavity of the magnetizable body, aligns itself in equilibrium, i.e., in a null position, with respect to the magnetizable body. When the magnetic flux of the magnetizable body is altered, the magnet realigns itself to a new or "altered" null position. If a wound wire coil is positioned near or around a core of the magnetizable body, and the first magnet is placed within or near the cavity of that body, current flowing through the wound wire coil creates a magnetic field in the magnetizable body which in turn reacts with the magnetic field of the first magnet and therefore cause the first magnet to adjust to a new null position with respect to the magnetizable body. The magnitude and direction of the current flowing through the coil determine the null position and, in particular, the angular deflection of the first magnet with respect to the magnetizable body. Thus, the present invention may be used as a meter mechanism. The wound wire coil modifies the magnetic flux of the magnetizable body; alternatively, the magnetizable body's flux may be altered by an external magnet placed near the magnetizable body.

The magnetizable body and a means for inducing an external magnetic field (e.g. a permanent magnet) may be used to create a magnetic field near the cavity of the magnetizable body.

The field in the region of the cavity may be of a single magnetic polarity when the first magnet is far from the cavity but is altered to have portions of different polarities when the first magnet is in position near the cavity.

Several embodiments of the present invention are described. The present invention may be used as a position indicator or transducer. The first magnet may be rigidly coupled to a mechanical lever or other device which may be moved. The angular movement of the first magnet will cause a corresponding movement of the lever, which will indicate the position of the external magnet or magnetic input which is induced to the magnetizable body, through its core. Alternatively, the lever of the first magnet may be attached to a potentiometer or otherwise coupled to a potentiometer and thereby transduce the mechanical position of the external element into an electric circuit.

The magnetic device described in the present invention may also be used as a limit switch or pressure switch or pressure transducer. In these embodiments, usually an external magnet is brought into close proximity to the core of the magnetizable body and causes changes in the magnetizable body's magnetic flux (by inducing a magnetic flux in the core) thereby changing the null position of the first magnet. The present invention may also be used as an actuator, wherein the lever of the first magnet or wound wire coil (armature) is coupled to a flap, a rudder or other device which is moved when the wound wire coil positioned near or around the core of the magnetizable body is energized. Thus, the current flowing through the wound wire coil will control the position of the flap, the rudder or other device attached to the lever of the first magnet or armature.

Other uses of the present invention include its use with a differential transformer, in which small displacements of the displaceable core of the differential transformer are converted via the first magnet into a meter indication. That is, a secondary winding of the differential transformer is coupled to a circuit which rectifies the signal from the secondary winding and is positioned around or near the core of the magnetizable body, and the first magnet or armature in the cavity or within the vicinity of the cavity responds to the changes in the magnetic field when the displaceable core of the differential transformer is displaced.

The present invention may also be used as a head positioner for disk drives. In this embodiment, a computer controls the current flowing through the wound wire coil positioned around or near the core of the magnetizable body and thereby controls the position of an arm attached to the first magnet or armature. The pickoff heads of the disk drive are attached to the arm rigidly affixed to the first magnet or armature and thus the pickoff heads can be positioned by the computer.

The invention may also be used with several devices sharing a common core. Several common core devices are disclosed.

The following detailed description, together with the drawings, will illustrate, by way of example, the principles, features and advantages of the invention.

DESCRIPTION OF THE DRAWINGS

FIG. 1b is a top view of the first magnet assembly shown in FIG. 1a.

FIG. 2b is a side view of the magnetizable body illustrated in FIG. 2a.

FIG. 3a is a top view of the first magnet and magnetizable body assembled.

FIG. 3b illustrates the assembly of FIG. 3a, viewed into the magnet and pole pieces.

FIG. 4a shows the assembly (first magnet and magnetizable body) with a wound wire coil wound about the core of the magnetizable body and a pointer rigidly affixed to the first magnet.

FIG. 4b is an end view of the assembly shown in FIG. 4a.

DETAILED DESCRIPTION OF THE INVENTION

Figure 2A:
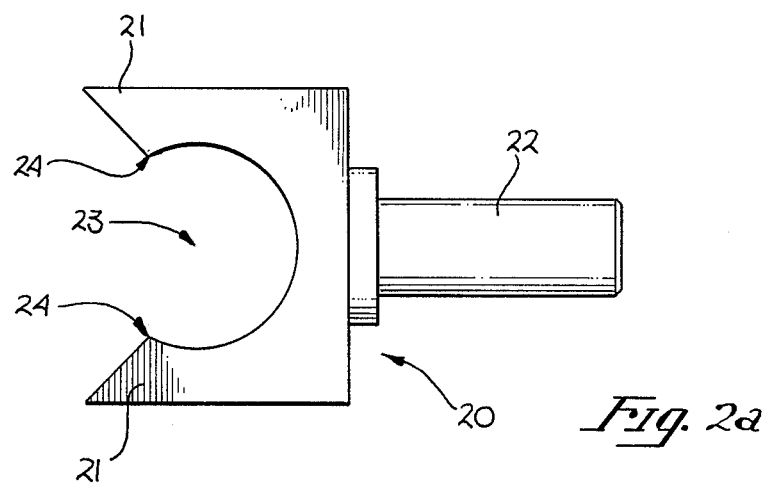
FIG. 2a illustrates the magnetizable body.
Figure 2B:
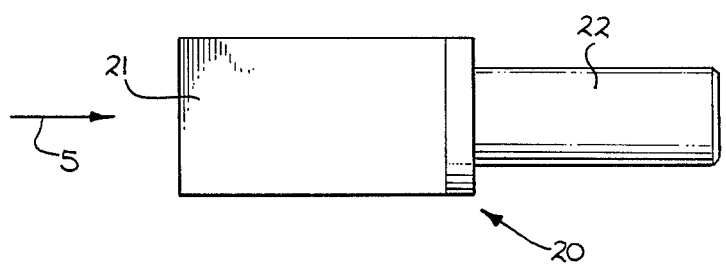

As shown in FIGS. 2a and 2b, the magnetizable body 20 has a core 22 which is joined to two pole pieces 21, which pole pieces define a region 23 disposed between said pole pieces 21; this region 23 is usually referred to as the cavity 23. .The core 22 is capable of receiving a magnetic flux and conducting that flux to the pole pieces. As shown in FIG. 2a, the core resembles a shaft but is called a core because many of the embodiments use the core as if it were the core of a transformer. The magnetizable body may be constructed to have any number of pole pieces; indeed it need not have discrete pole pieces as when the cavity is formed by hollowing out a magnetizable body which resembles a rod. The magnetizable body is to be made of a high permeability material—a material that is easily magnetized when subjected to a magnetic field and easily demagnetized when removed from the magnetic field (e.g. transformer steel or equivalent). When a pole of a magnetic field is brought within the vicinity of the core 22 of the magnetizable body 20 so that the core is magnetized by the field, the polarity of the induced field at pole pieces 21 will be the same as long as the magnetizable body is not influenced by other magnetic fields, and will be the same as the polarity of that pole of the applied field. See FIG. 14. Thus, if the polarity of the applied field is north (N), the polarity of the pole pieces 21 would be north (N). Magnetic induction into the core 22 of the magnetizable body 20 may be accomplished by exposing the core 22 to the magnetic field of an external magnet (e.g. a permanent magnet) or by inducing a magnetic field within the core 22 by passing an electric current through a coil of wire that is wound about or near the core 22. The arrow 5 shown in FIG. 2b is parallel to the plane defined by the two pole pieces; that plane is perpendicular to FIG. 2b.

The magnetizable body 20, as shown in FIG. 2a, may have a Y-shaped structure which includes the pole pieces 21 and the core 22. If a coil is placed around the core 22 and if that coil is energized (i.e. current is passed through the coil), then the coil will induce a magnetic field of the same polarity in both pole pieces 21 as long as other fields are not present to influence the pole pieces. Thus, the two pole pieces, having identical magnetic polarities, will create a magnetic field of substantially one magnetic polarity between the two pole pieces (i.e. in the region 23). Since the current in the coil (positioned around the core 22) is variable, the magnetic field is also variable. Instead of the coil, other means for creating an external magnetic field near the magnetizable body may be used. For example, a permanent magnet may be used; by varying the distance between that magnet and the core 22, the single pole magnetic field may be made variable. The word "external", when used in the phrase "external magnetic field", is used to indicate something (e.g. a magnet) other than the first magnet.

It should be understood that the shape of the tips of the pole pieces 21 influence the sensitivity of the apparatus of the instant invention. The tips 24 of the pole pieces 21 should be closer to the first magnet 10 than is the junction of the pole pieces 21. Thus, as shown in FIG. 3a, the tips 24 are much closer to the perimeter of the first magnet 10 than is the junction of the pole pieces. It is frequently preferable that the surface area of each tip 24 be small since the precision of the invention improves as the surface area of the tips 24 decreases to some nominal or optimal configuration. Any shape of the magnetizable body is possible provided a first magnet has a null position near the cavity of the body.

The distance between the tips 24 of the pole pieces 21 may be adjustable. By providing a rotatable joint at the junction of the pole pieces, the pole pieces may be moved closer or farther from each other, thereby varying the sensitivity of the apparatus. For example, one pole piece may be mounted to the core by a ball and socket joint allowing that one pole piece to be moved relative to another (fixed) pole piece. Various other mounting arrangements, known to those skilled in the art, could be used so that the distance (and angle) between the pole pieces may be varied.

Figure 1A:
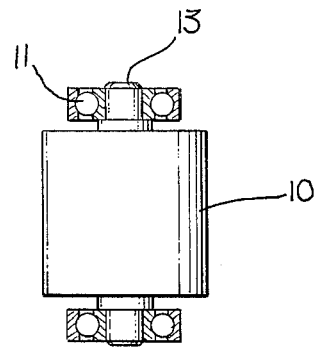
FIG. 1a shows the first magnet assembly.
Figure 1B:
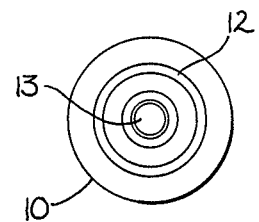

Referring to FIGS. 1a and 1b and 3b, the first magnet 10 is rotatably mounted on bearings 11 contained in a bearing assembly 12 on a shaft 13, supported between support plates 25. The shaft 13 defines the rotational axis of the first magnet. The first magnet 10 shown in FIGS. 1a and 1b is a bi-polar cylindrical permanent magnet. Consistent with the present invention, the first magnet may be multi-polar or an electromagnet and may be provided with other suitable means for it to rotate freely. Furthermore, it need not be cylindrical; a spherical magnet would work with this invention. Also, a square or bar magnet can function with the present invention.

In the assembly depicted in FIGS. 3a and 3b, the first magnet is rotatably mounted on a shaft 13 (a rotational axis) that is perpendicular to the axis joining of the pole pieces 21. The first magnet has at least a portion thereof within the cavity 23 such that the first magnet is free to rotate about its axis which is defined by its shaft 13. Usually, the first magnet is rotatably mounted on the shaft 13 so that it is capable of movement only about the shaft 13; that is, in so far as movement is concerned, the first magnet can only rotate around the shaft 13. The bearing support plates 25, which are made of non-magnetic material, are attached to the magnetizable body 20.

The first magnet 10 need not be placed totally within the cavity 23, nor need it be placed within the cavity at all if its magnetic field is strong enough to interact (and hence be magnetically coupled) with the poles 21 in accordance with this invention. Thus, the positioning of the first magnet is described as "near" the cavity; near the cavity, as used to describe and claim this invention, means within the cavity or at least partly within the cavity or completely outside of the cavity but in any event close enough to the cavity for magnetic interaction to take place between the field of the first magnet (10) and that of the poles 21.

The first magnet 10 should be placed close enough to the cavity 23 so that the first magnet 10 has a null position which may be altered, by, for example, moving a permanent magnet toward the core 22 or by passing current through a coil wound around the core 22. The present invention decribes other ways to alter the null position of the first magnet 10 (by altering the magnetic flux through the magnetizable body).

It is important to realize that the first magnet 10 will have a null position even in the simple assembly depicted in FIG. 3a, wherein no coil or external magnet is present; this is because the first magnet 10 seeks an angular position of equilibrium caused by the magnetic attraction between the first magnet and the pole pieces. Thus, the first magnet interacts magnetically with the magnetizable body depicted in FIG. 3a and maintains a null position and will revert back to that position if it is displaced, as when one physically rotates the magnet and then lets the magnet go free.

The null position is characterized in that at the null position, the first magnet will remain at rest because it experiences a net torque (about the rotational axis) of zero. Displacing the first magnet from the null position (assuming there is no change in the external magnetic field so there is no change in the flux, if any, induced in the core) will cause the first magnet to experience a net torque (about the rotational axis) not equal to zero that causes the first magnet to resiliently rotate back to the null position. Hence, at a position other than the null position, the first magnet is forced back to the null position. Importantly, the null position may be altered; the altered (or new) null position has the same characteristics as the old (i.e. prior) null position.

As depicted in FIGS. 3a and 3b, the first magnet 10 may rotate in only one plane, and that plane is defined by the two pole pieces 21. Thus, if a pointer 31 is tangentially attached to the surface of the first magnet 10, it can be made to rotate from one pole piece to the other. However, in accordance with the present invention, it is possible that the first magnet could be allowed to rotate in more than one plane.

The first magnet 10, when placed near the cavity of the magnetizable body, has a magnetic field which interacts with the magnetic field of the magnetizable body 20. Hence the first magnet 10 is magnetically coupled to the body. The first magnet 10 aligns itself, usually angularly, to a position of zero torque or equilibrium, called the null position because of the magnetic coupling between the first magnet and the magnetizable body. The first magnet 10 will remain in this position unless it is displaced by, for example:

(A) A change in the magnetic field intensity of the poles 21 of the magnetizable body 20;
(B) A change in the magnetic polarity of the poles 21 of the magnetizable body 20;
(C) A change of physical position of the first magnet 10 with relation to the magnetizable body 20;
(D) A change of the magnetic field of the first magnet 10;
(E) Any combination of the above.

The magnetic field intensity or polarity of the poles 21 through the magnetizable body may be altered by, for example:

(A) Bringing an external permanent magnet within the magnetic coupling proximity of the core 22 of the magnetizable body 20. The magnetic intensity of the coupling varies inversely as the square of the distance between the external magnet and the core 22 of the magnetizable body 20;
(B) Electrically energizing a coil that is wound around the core 22; the magnetic flux induced in the core by such a coil is dependent on the current in the coil—hence, that flux is referred to as a current dependent magnetic flux;
(C) Inducing an electric current in the coil wound around the core 22 by electromagnetic induction from an external wound coil or an external primary coil of a transformer.

Thus, if a pointer 31 is rigidly affixed to the first magnet 10, the pointer will be moved as the first magnet is angularly re-positioned to a zero torque condition (i.e.

new null position) when the assembly (i.e. first magnet and magnetizable body) is subjected to any of the magnetically altering conditions as above described. Thus, the pointer 31 will indicate changes in the magnetic flux of the magnetizable body.

For example, by coupling the magnetizable body to a lever or a float, the position of the lever or float may be indicated by the movement of the first magnet 10 as the magnetizable body 20 is moved by the lever or float.

Figure 5:
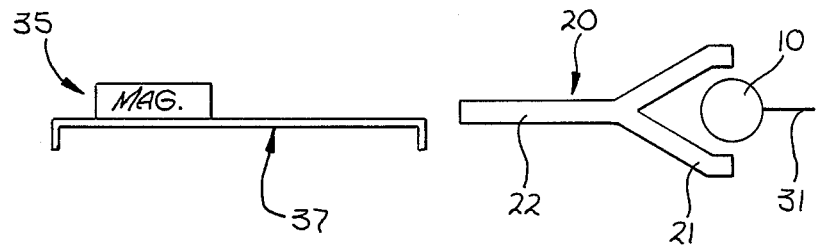
FIG. 5 shows the assembly with an external magnet.

The present invention may be used for a limit switch. For example, if an external magnet 35, which is rigidly affixed to a device having the capability of moving to and away from the stationary magnetizable body 20, is brought within close proximity of the core 22 of the magnetizable body 20, such that the magnetic field ("external magnetic field") of the external magnet 35 changes the magnetic flux through the core 22, the first magnet 10 and its rigidly supported pointer 31 are angularly displaced so as to depress the actuator of a switch thereby opening up an electrical circuit or making (closing) an electrical circuit. See FIG. 5. Alternatively, the pointer 31 on the first magnet 10 could be coupled to a circuit or otherwise cause the change of conductivity of a switch. An external magnet 35 moving along the axis of the core 22 alters the magnetic field characteristics of the magnetizable body 20 and thereby causes the angular movement of the pointer 31, which would change the electrical conductivity of the double acting switch. Referring to FIG. 5, the external magnet 35, which creates an external magnetic field, is positioned on a rail 37 which allows the external magnet 35 to move in the axis of the core 22. As the external magnet 35 approaches the core 22, the pointer 31 changes its position, and thereby can change the conductivity of the switch. Of course, the pointer 31 may also be used to indicate the position of the external magnet 35.

In the same way, the present invention can be used as a pressure switch or proximity switch. In this embodiment, illustrated generally in FIG. 5, the external magnet is coupled to a sensing device which responds to the pressure applied to the sensing device. The sensing device usually includes a spring or other means for providing resistance against movement of the device. In accordance with the present invention, the external magnet 35 driven by the pressure sensing device, will move to or away from the core 22 in response to the pressure and thereby cause rotation of the first magnet 10 and the attached pointer 31. The pointer 31 may be coupled to a circuit and thereby change the conductivity of a switch turning that circuit on or off depending on the pressure applied to the external magnet 35.

Figure 6:
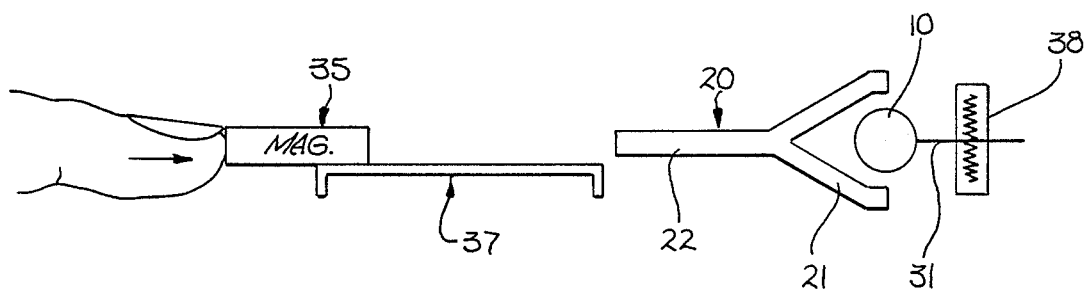
FIG. 6 shows the assembly as a pressure or position transducer.

Another embodiment of the instant invention is illustrated in FIG. 6 wherein the pointer 31, which is attached to the first magnet 10, acts as a wiper on a potentiometer 38 or other variable resistance means, and thereby varies the resistance of the potentiometer circuit. The pointer 31 moves in response to pressure applied to the external magnet 35 which is aligned on the axis of the core 22 and moves to and from the core 22, on the rail 37, in response to pressure applied to the external magnet 35. Again, the external magnet 35 is connected to a device which usually has a spring or other means for providing resistance against movement of the external magnet 35. Thus, in this embodiment, pressure applied to external magnet 35 will be transduced into a resistance level of the potentiometer, which resistance could be used to measure the pressure applied to external magnet 35. As the external magnet 35 approaches (or moves away from) the core 22, the magnetic flux through the core 22 changes, causing a change in the flux of the pole pieces 21, which causes a change in the null position of the first magnet 10. Similarly, the position of the external magnet 35 will be transduced into a resistance level of the potentiometer, which resistance could be used to measure the position of the external magnet 35. Alternatively, pressure could be applied directly to the core 22 of the magnetizable body, which pressure, usually applied perpendicularly to the length of the core 22, would correspond to a predetermined level of resistance in the potentiometer. Other mean for varying the resistance or transducing the pressure into a circuit parameter could be used in accordance with the present invention. For instance, a variable resistor may be used in place of a potentiometer; in that case, the pointer 31 could be used as a terminal of the variable resistor.

Figure 7:
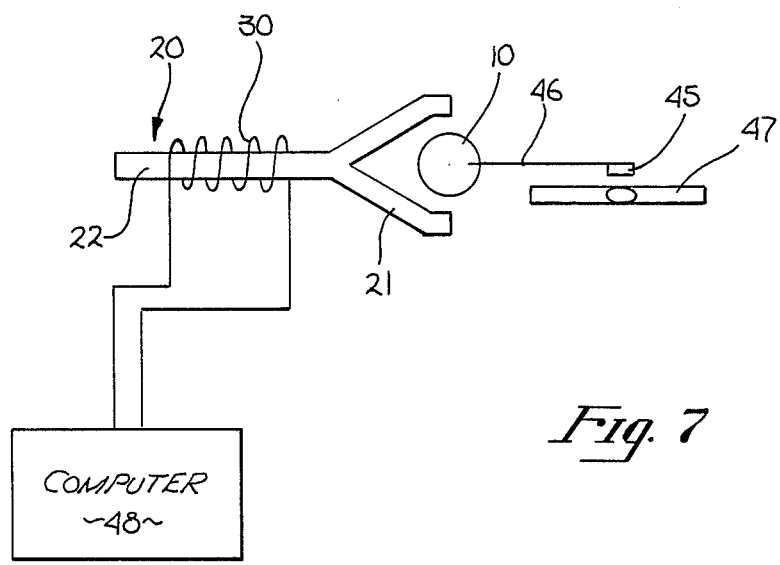
FIG. 7 shows the assembly as constructed for a head positioner for a disk drive.

The present invention may also be used as a head positioner for disk drives. Referring to FIG. 7, an arm 46 supporting the magnetic pickoff 45 of the disk drive is rigidly attached to the first magnet 10, and the first magnet is positioned near the cavity of the magnetizable body 20. The first magnet 10 is positioned close enough to the cavity that a null position is established for the first magnet. Thus, changes in the magnetic flux of the magnetizable body will result in a change in the position of the first magnet (to its new null position). A coil 30 is positioned near or around the core 22 of the magnetizable body, and the coil 30 is connected to a computer 48. The computer, by controlling the direction and magnitude of the current flowing through the coil 30 can control the position of the pickoff head 45, which is attached to the arm 46 mounted on the first magnet 10. Thus, the computer can bring the head closer to the center of the diskette 47 or further from the center of the diskette by varying the direction and magnitude of the current flowing through the coil 30.

The head positioner for disk drives is really an example of the many uses of the present invention as an actuator. For example, a flap or a rudder may be attached to the arm 46 instead of the pickoff head 45. In such a configuration, the current flowing through the coil 30 will control the position of the flap or rudder which is attached to the arm 46. Thus, the present invention may be used to convert electrical circuit parameters into mechanical movement of physical objects.

It should be noted that both the external magnet 35 and the coil 30, illustrated in FIGS. 5 and 4a respectively, are examples of means for creating an external magnetic field. (Again, "external", as used in the phrase "external magnetic field", is used to indicate some field created by other than the first magnet.) In these cases, of course, that magnetic field is created near enough to the magnetizable body that it will affect the null position of the first magnet. When one wants to stop the effect of the external magnetic field, one simply removes the external magnet 35 (at least far enough that it will not influence the null position) or turns off the current flowing through the coil 30.

One very suitable embodiment of the invention operates as an analog meter instrument which could be used to detect or measure current. Referring to FIG. 4a, the coil 30 is positioned around the core 22 of the magnetizable body 20. It should be appreciated that the coil 30 need not be wrapped around the core 22 for the present invention to function. The coil 30 may be placed near enough to the core so that changes in the current flowing in coil 30 will change the position of the first magnet 10. Of course, the closer the coil 30, the more sensitive the instrument. The coil 30 is coupled to a circuit so that it may receive a signal from the circuit which is appropriate for the value to be measured. For example, if the meter instrument is to measure current, the coil 30 is coupled to the circuit so that the current flowing through the circuit will flow through the coil 30. As is well known in the art, various shunts may be used to reduce the current flowing through the coil. The current flowing through the coil 30 changes the magnetizable body's magnetic flux so that the first magnet 10 will rotate to a new null position as the current changes in the coil 30.

With the pointer 31 attached to the first magnet 10, the present invention will act as an analog meter since the current flowing through the coil 30 will determine the position of the pointer 31 attached to the first magnet 10. Thus, by placing an appropriately calibrated scale under the pointer 31 one could directly read off the current flowing through the coil 30. Similarly, the device could be used to measure voltage or resistance depending on the manner, well known in the art, in which the coil is coupled to the circuit to be measured. In the embodiment shown in FIG. 4, the first magnet 10 rotates on a shaft 13, so that it rotates in the plane defined by the two pole pieces 21. The two pole pieces 21 may be pivotally joined so that the pole pieces 21 may be opened or closed depending on the amount of angular deflection one wants the pointer 31 to have.

Figure 14:
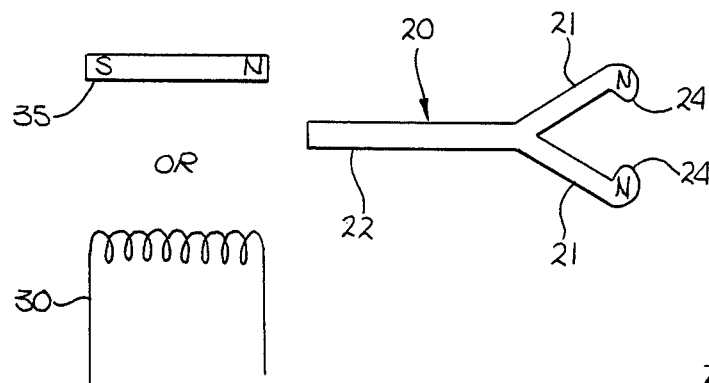
FIG. 14 shows the apparatus for creating an induced magnetic field near the cavity.

As noted previously, the magnetizable body and a means for creating an external magnetic field may be used to create a magnetic field near the cavity of the magnetizable body. As shown in FIG. 14, the external magnetic field may be created by either the external permanent magnet 35 or a coil 30 (when energized). The external permanent magnet 35 should be placed in line with the long axis of the core 22; similarly, the coil 30, when used instead of the external magnet 35, is preferably wrapped around the core 22. In either case, the means for creating an external magnetic field induces a magnetic field of the same polarity in both pole pieces 21 when the first magnet is not in position near the cavity. This common polarity is (shown as North in FIG. 14). By controlling the coil 30 (or the external magnet 35), one can vary the magnetic field's intensity and can change its polarity.

Figure 12:
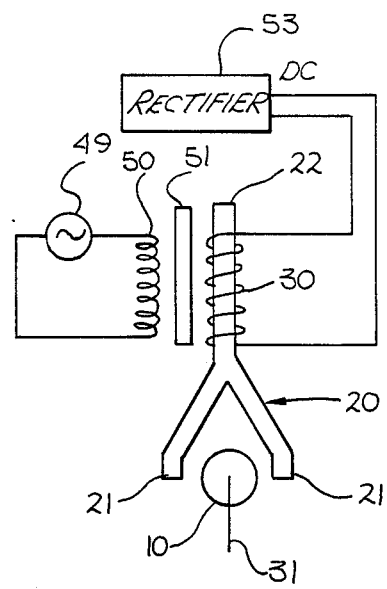
FIG. 12 shows the invention used with a differential transformer.

In another very suitable embodiment, illustrated in FIG. 12, the invention may be used as a position indicator or translator of small displacements, by coupling the winding 30 positioned around or near the core 22 to a rectifier 53; the winding 30 is a secondary winding of a differential transformer. The displaceable core 51 of the differential transformer is generally juxtaposed to the primary winding 50 and the secondary winding 30 and is displaceable. The primary winding 50 is coupled to an alternating current source 49. Small displacements of the displaceable core of the differential transformer correspond to small changes in the current in the winding 30, which changes the position of the pointer 31. Thus, small displacements are indicated by the pointer 31. Of course, the primary winding 50 of the differential transformer would be coupled to an appropriate circuit (e.g. an alternating current source 49) so that displacements of the displaceable core of the differential transformer would cause changes in the current flowing through the coil 30.

If a position transducer is desired, the pointer 31 is coupled to a variable resistance means. The pointer 31 could be used as a wiper on a potentiometer, or could be mechanically coupled to a potentiometer to change the resistance of the potentiometer. Small displacements of the displaceable core of the differential transformer would be reflected in movements of the pointer 31, which would change the resistance of the variable resistance means.

Figure 8:
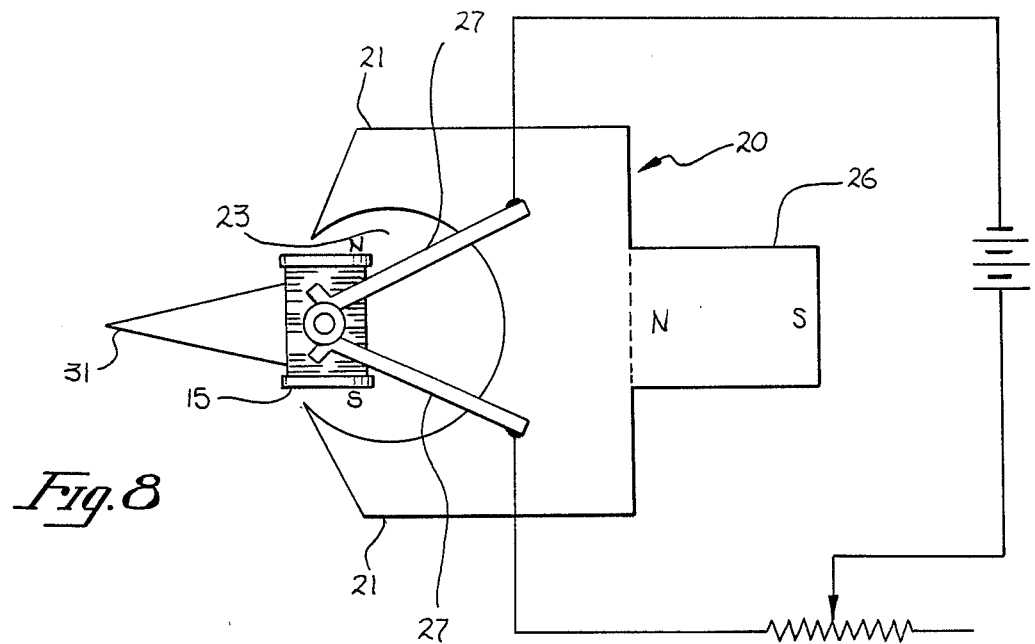
FIG. 8 shows the assembly as a meter mechanism.
Figure 9:
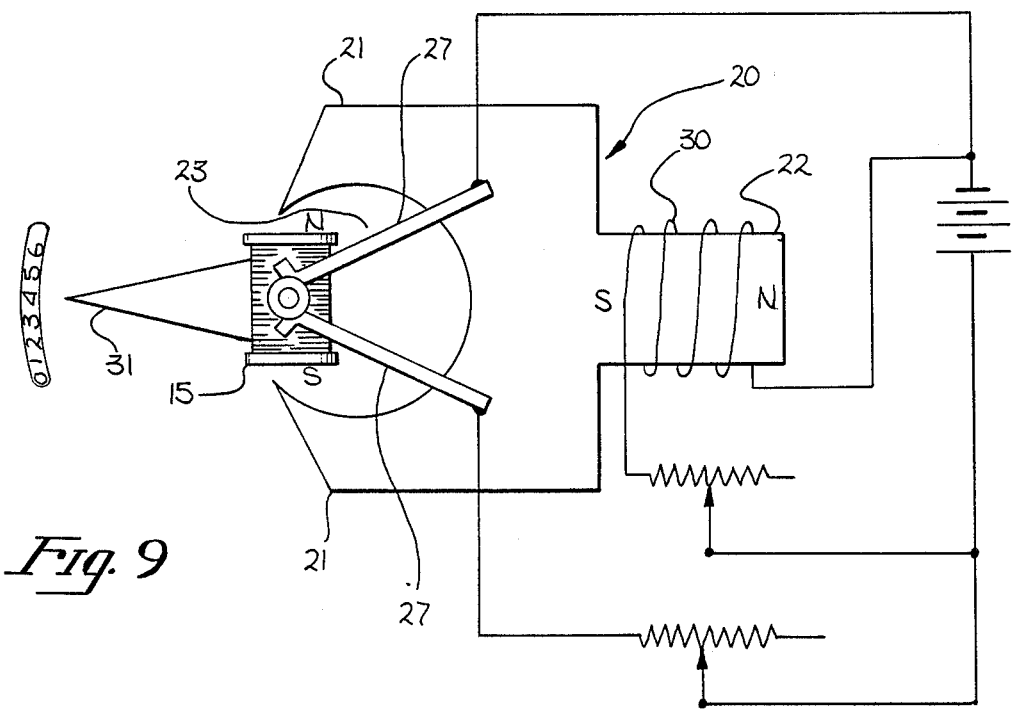
FIG. 9 shows the assembly as a meter mechanism.

Referring now to FIGS. 8 and 9, the instant invention may be used as a meter mechanism for measuring and/or detecting circuit parameters; these particular embodiments use a wire wound coil electromagnet 15 instead of a permanent magnet for the first magnet. The electromagnet 15 functions in much the same way as the permanent magnet, depicted as 10 in FIGS. 3a and 4a. Thus, the electromagnet 15 is the first magnet of the embodiments illustrated in FIGS. 8 and 9. When the coil of the electromagnet 15 is energized (i.e. current flows through the coil), the electromagnet 15 has a null position which is determined by the magnetic interaction between the electromagnet 15 and the magnetizable body 20. Hence, once the electromagnet 15 is energized, it functions as the first magnet functions.

The electromagnet 15 is mounted so that one pole of the electromagnet 15, when energized, faces one of the pole pieces 21 and the other pole of the electromagnet 15 faces the other pole piece 21. That is, the electromagnet 15 is mounted such that the direction of its North ("N") to South ("S") axis, or vice versa, is perpendicular to its rotational axis.

As shown in FIG. 8, the mangetizable body 20 includes the two pole pieces 21, made from magnetizable material of high magnetic permeability, a cavity formed by th two pole pieces and an attached permanet magnet 26 that is joined to the junction of the two pole pieces 21. The attached permanent magnet 26 occupies the same physical location as the core 22 in the embodiment illustrated in FIG. 3a. The electromagnet 15 is rotatably mounted near the cavity 23 and is coupled to the circuit to be measured or detected by wires supported by the support beams 27. Those wires could carry the current to be measured and, therefore, that current would create a magnetic field about the electromagnet 15 which would interact with the magnetic field in the magnetizable body. The electromagnet 15, in response to the magnetic interaction between its magnetic field and the field of the magnetizable body moves to its null position that is determined by the current flowing through the electromagnet's (15) coil. Thus, the pointer 31 attached to the electromagnet 15 will indicate the direction and magnitude of the current in the electromagnet 15. Of course, this mechanism could be used to detect current as well as measure it.

The meter mechanism shown in FIG. 9 is very similar to the mechanism illustrated by FIG. 8, except that the mechanism of FIG. 9 uses a coil 30 around the core 22 to create a magnetic field about the magnetizable body. The electromagnet 15, once energized, functions just as the first magnet functions. The electromagnet 15 is mounted so that one pole of the electromagnet 15 when energized, faces one of the pole pieces 21 and the other pole of the eletromagnet 15 faces the other pole piece 21. That is, the eletromagnet 15 is mounted such that the direction of its North ("N") to South ("S") axis, or vice versa, is perpendicular to its rotational axis. The electromagnet 15, when energized, seeks its null position and will there remain until it is forced to seek its new null position as a result of the change in the magnetic field created by current flowing in the coil 30 wrapped around the core 22. The coil 30 induces a magnetic field in the magnetizable body, and hence in the two pole pieces 21; the null position of the electromagnet 15 is determined by the interaction between its magnetic field and the field of the magnetizable body. Thus, if the coil 30 (also referred to as a "first coil") is "energized" (i.e. current is caused to flow through the coil) by a constant D.C. voltage, the electromagnet 15, if also energized, will seek its null position which will be determined by the interaction between the electromagnet's (15) magnetic field and the field of the magnetizable body. Thus, the direction and magnitude of the current flowing in the electromagnet's coil (also referred to as a "second coil") will determine the null position of the electromagnet 15. The electromagnet 15 is rotatably mounted near the cavity 23 and is coupled to the circuit to be measured or detected by wires being supported on the support beams 27. The pointer 31 attached to the electromagnet 15 will indicate the direction and magnitude of the current in the electromagnet. Of course, the roles of the first coil and the electromagnet's coil could be reversed; direct current would be applied to the electromagnet's coil and the current to be measured is applied to the first coil (coil 30). Then, the current flowing in the first coil will determine the null position of the electromagnet.

Figure 13:
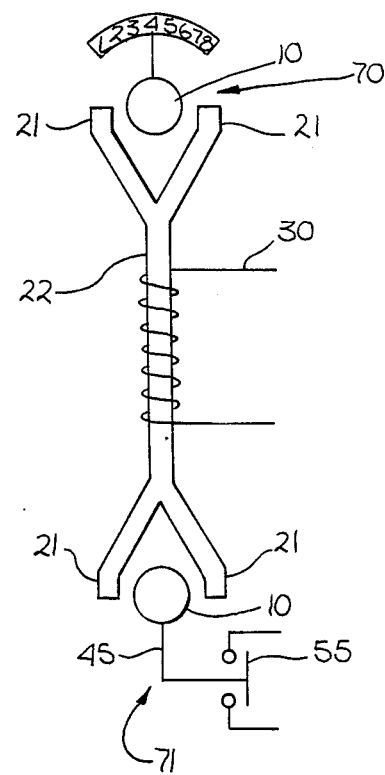
FIG. 13 shows a common core device.

The present invention may be used with several devices using the same core. For example, referring to FIG. 13, a core 22 could include a coil 30 for an ammeter mechanism 70 embodied in the two pole pieces 21 and first magnet 10 and that same coil could be simultaneously used for another embodiment, such as an actuator 71 having another two pole pieces 21 and a first magnet 10. Such a device could then be used as an actuator and an ammeter and have two moving elements (i.e. two first magnets). Thus, this device could be used to measure the current flowing in the coil 30 and then automatically turn that current off at a certain level. Various other combinations may be envisioned which are consistent with the present invention.

Figure 10:
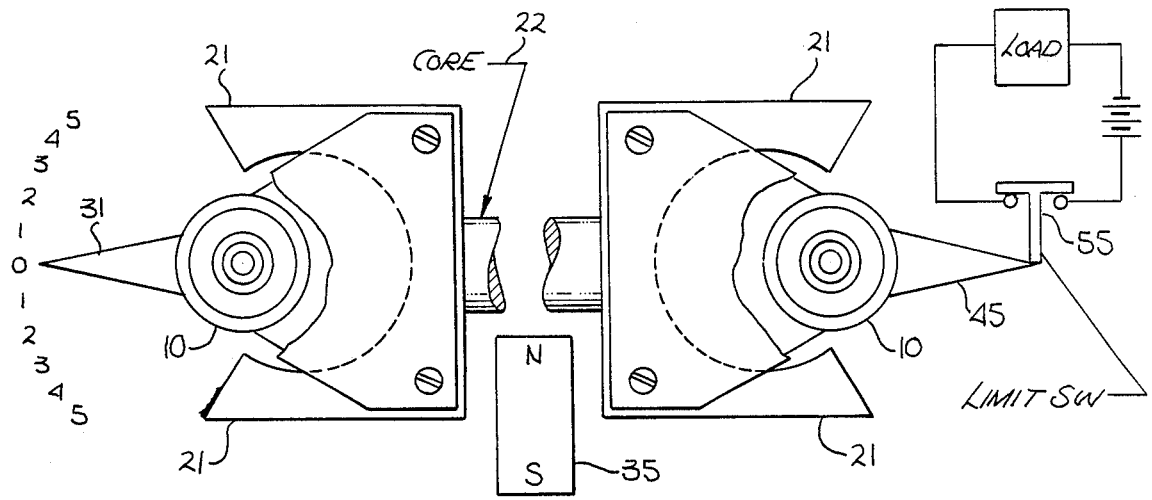
FIG. 10 shows a common core device with two assemblies.

Referring to FIG. 10, a device having a common core 22 is illustrated. This device has two sets of pole pieces, one on each end of the core 22, and two first magnets 10. Each of the assemblies at the ends of the core 22 constitutes a separate assembly capable of functioning as described above. Thus, each first magnet 10 will remain in its null position until those positions are altered as described above. Since each assembly (first magnet and pole pieces) shares a common core, a magnetic input, such as the external magnet 35 illustrated in FIG. 10, affects both assemblies simultaneously. The common core device in FIG. 10 has a position indicator, embodied in the assembly on the left-hand side of the common core 22, and a proximity actuator on the other side. Thus, this device will measure the proximity of the external magnet 35 (by the assembly on the left) and it will change the conductivity of the switch 55 which is mechanically coupled to the first magnet 10 by the arm 45.

Any number of, and any combination of mechanisms utilizing the present invention may be physically and/or electrically tied together and/or to each other to produce the desired results one intended. In the common core device shown in FIG. 10, a coil near the core, a secondary of a transformer (e.g. differential transformer as described herein), or other sources of a magnetic field, may be used in conjunction with or substituted for the external permanent magnet 35 of FIG. 10. The external permanent magnet 35 of FIG. 10 may be positioned as shown or rotated 90° from that position; indeed it could be positioned in any manner with respect to the common core.

Figure 11:
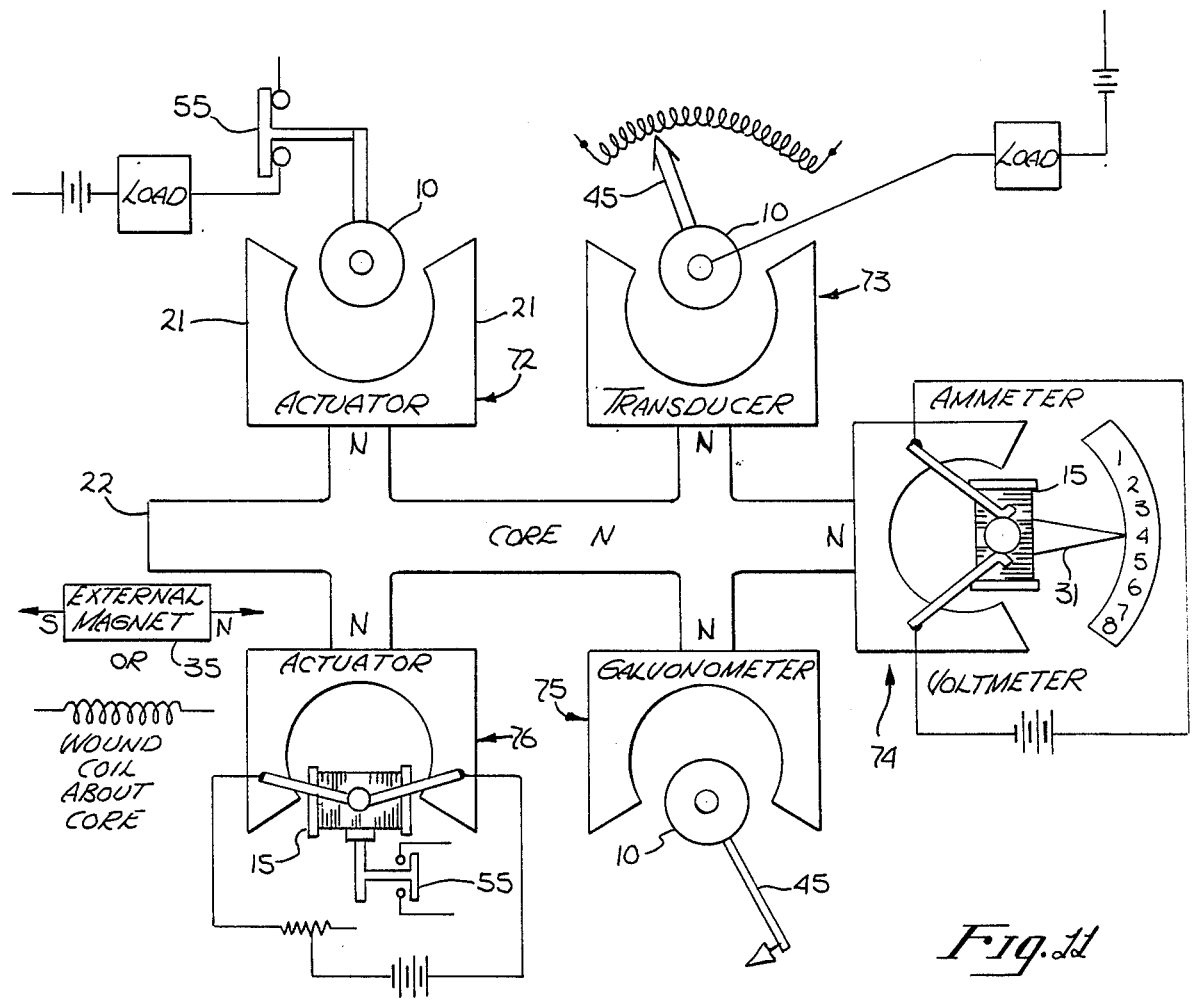
FIG. 11 shows a common core device with five assemblies.

Referring now to FIG. 11, the common core 22 has five assemblies attached thereto. These assemblies are: the actuator 72, the transducer 73, the ammeter, voltmeter or equivalent 74, the galvanometer recording pen 75 and the actuator 76. The common core 22 may accept a magnetic input from any means for creating an external magnetic field. As shown in FIG. 11, the external magnet 35 or the wound coil 30 may be used as a means for creating an external magnetic field. Of course, the ammeter 74 and the galvanometer 75 would usually be used only with the coil 30. As shown in FIG. 11, when the external magnet 35 (or its coil 30 equivalent) is positioned as shown in FIG. 11, the five assemblies and a portion of the core have the same magnetic polarity, North. The common core 22 shown in FIG. 11 and the five sets of pole pieces 21 may be referred to as a magnetizable body having a plurality of cavities.

In summary, a magnetic circuit is created between a first magnet, which is preferably free to rotate within a variable magnetic field, and a magnetizable body. This magnetic field, made up of more than one physical pole, has the capability of altering its polarity as well as its magnetic intensity. The first magnet when used in conjunction with the magnetizable body will always seek its own null position. Applications of external magnetic fields will change the null position of the first magnet.

While a particular form of the invention has been illustrated and described, it will be apparent that other modifications can be made without departing from the spirit and scope of the invention.

I claim:

1. A magnetic apapratus comprising:
   a magnetizable body having at least one pair of pole pieces defining a region therebetween and having a core capable of receiving a magnetic flux and of conducting said flux to the pole pieces to excite them with a single polarity, the core being positioned substantially outside the region between the pole pieces; and
   at least one first magnet mounted for rotation relative to the pole pieces about an axis in proximity to said region, each first magnet being constructed and arranged to interact magnetically with one pair of pole pieces so as to seek and maintain a null position with respect to said body, the null position for each first magnet being characterized in that at the null position the first magnet experiences zero net torque about the rotational axis and remains at rest, and at a position other than the null position the first magnet experiences a nonzero net torque about the rotational axis forcing the first magnet to return to the null position;
   each first magnet being controlled by only one pair of pole pieces, excited with a single polarity.

2. The magnetic apparatus of claim 1 wherein:
   the null position is capable of being altered by inducing a magnetic flux in the core such that when a magnetic flux is induced in the core and conducted to the pole pieces, the first magnet moves to an altered null position corresponding to the direction and magnitude of the induced magnetic flux.

3. The magnetic apparatus of claim 2 for use as a meter mechanism further comprising:

an electrically conductive coil positioned near the core and coupled to a circuit for passing a current through the coil, the coil being capable of inducing in the core a current-dependent magnetic flux determined by the direction and magnitude of the current to alter said null position; and a pointer mounted to the first magnet for rotation therewith;

whereby the angular position of the pointer indicates the magnitude and direction of the current through the coil.

4. The magnetic apparatus of claim 2 for use as a meter mechanism wherein:

the first magnet is an electromagnet; and the apparatus includes a pointer mounted to the electromagnet for rotation therewith;

whereby the angular position of the pointer indicates the magnitude and direction of the current through the coil.

5. The meter mechanism of claim 4 which further comprises:

an electrically conductive winding wrapped around the core; and means for causing a direct current to flow through the winding to induce said magnetic flux in the core and therefrom to the pole pieces of the magnetizable body.

6. The magnetic apparatus of claim 2 for use as a meter mechanism wherein:

the first magnet is an electromagnet having an electrically conductive coil and means for causing a first current to flow through said coil; and the apparatus further comprises:

a pointer mounted to the electromagnet for rotation therewith; and an electrically conductive winding wrapped around the core and adapted to carry and receive a second current to induce a current-dependent magnetic flux in the core and the pole pieces, the current-dependent magnetic flux being determined by the direction and magnitude of the second current;

whereby the null position of the electromagnet, and thus the position of the pointer, is determined by the relationship between the first and second currents.

7. The magnetic apparatus of claim 2 which further comprises:

means for creating an external magnetic field near the magnetizable body, said means for creating an external magnetic field being capable of inducing a magnetic flux in the core which is conducted to the pole pieces to alter an initial null position of the first magnet.

8. The magnetic apparatus of claim 7 wherein said means for creating an external magnetic field comprises:

an electrically conductive coil positioned near the magnetizable body so that current flowing through the coil induces a magnetic flux in the core and therefrom to the pole pieces to alter the initial null position of the first magnet.

9. The magnetic apparatus of claim 2 which further comprises:

a pointer attached to said first magnet; and mechanical joint means joining the pole pieces to the core so that the pole pieces may be moved relative to each other to vary the distance between them;

whereby current flowing through the coil determines the position of the pointer and whereby an optimum angular deflection of the pointer may be modified by varying the distance between the pole pieces.

10. The magnetic apparatus of claim 7 wherein said means for creating an external magnetic field comprises:

a permanent magnet positioned near the magnetizable body such that the permanent magnet induces a magnetic flux in the core and therefrom to the pole pieces to alter the initial null position of the first magnet.

11. The magnetic apparatus of claim 2 for use as a position indicator capable of measuring small displacements, the apparatus further comprising:

a differential transformer having an external primary winding coupled to an alternating current source, a secondary winding wound about the core of the magnetizable body and electrically connected to a rectifier, and a displaceable core of the differential transformer capable of varying the flux coupled from the primary winding to the secondary winding so as to very and control the magnetic flux in the magnetizable body, the magnetic flux in the magnetizable body being dependent on the current flowing in the primary winding and the position of the displaceable core; and a pointer attached to the first magnet;

whereby movement of the displaceable core alters the current flowing through the secondary winding and changes the current dependent magnetic flux through the core and into the pole pieces of the magnetizable body, thereby determining the null position of the pointer.

12. The magnetic appratus of claim 1 wherein:

the magnetizable body has a plurality of pairs of said pole pieces extending from a common core, each pair of pole pieces defining a region therebetween and having a first magnet mounted for rotation in proximity to the region for interaction with the pair of pole pieces.

13. The magnetic apparatus of claim 12 wherein:

the magnetizable body has two pairs of said pole pieces dispose at opposite ends of a common core.

14. The magnetic apparatus of claim 12 wherein:

one of the first magnets is a permanent magnet and the other of the first magnets is an electromagnet.

15. A magnetic apparatus comprising:

a magnetizable body having at least one pair of pole pieces defining a region therebetween and having a core capable of receiving a magnetic flux and conducting the flux to the pole pieces to excite them with a single polarity, the magnetizable body having a generally Y-shaped structure with pole pieces branching off from each other on one side of a junction portion and the core disposed on an opposite side of the junction portion so that the pole pieces define a plane and the core is positioned substantially outside the region between the pole pieces; and at least one first magnet mounted for rotation about an axis in proximity to said region and substantially perpendicular to the plane defined by the pole pieces, each first magnet being a cylindrical permanent magnet directed along the rotational axis and constructed and arranged to interact magnetically with one pair of the pole pieces such that it maintains a null position about the rotational axis with respect to said body, the null position for each first magnet being characterized in that at the null position the first magnet experiences zero net torque about the rotational axis and remains at rest, and displacement of the first magnet from the null position results in a nonzero net torque about the rotational axis to rotate the first magnet resiliently back to the null position, the null position being alterable by inducing a magnetic flux in the core such that when a magnetic flux is induced in the core the first magnet is caused to rotate to an altered null position corresponding to the direction and magnitude of said flux;

each first magnet being controlled only by one pair of pole pieces, excited with a single polarity.

16. The magnetic apparatus of claim 15 which further comprises:

means for creating an external magnetic field near the magnetizable body, the means for creating an external magnetic field being capable of inducing a magnetic flux in the core and therefrom to the pole pieces to alter the null position of the first magnet.

17. The magnetic apparatus of claim 16 wherein: each first magnet has at least a portion thereof in the region between the pole pieces with which it interacts.

18. The magnetic apparatus of claim 17 wherein:

the means for creating an external magnetic field comprises an electrically conductive coil positioned near the core of the magnetizable body so that current flowing through the coil induces a magnetic flux in the core and therefrom to the pole pieces to determine the null positions of the first magnets; and the apparatus further comprises a pointer rigidly attached to one of the first magnets;

whereby current flowing through the coil determines the position of the pointer.

19. The magnetic apparauts of claim 15 for use as a meter mechanism further comprising:

an electrically conductive coil positioned near the core and coupled to a circuit for passing a current through a coil, the coil being capable of inducing in the core a current-dependent magnetic flux determined by the direction and magnitude of the current to alter said null position; and a pointer mounted to the first magnet for rotation therewith;

whereby the angular position of the pointer indicates the magnitude and direction of the current in the coil.

* * * * *

UNITED STATES PATENT AND TRADEMARK OFFICE
CERTIFICATE OF CORRECTION

PATENT NO. : 4,774,458

DATED : September 27, 1988

INVENTOR(S) : Leonard S. Aronoff

It is certified that error appears in the above-identified patent and that said Letters Patent is hereby corrected as shown below:

BACKGROUND OF THE INVENTION:

Column 1, line 54, change "D'Arsonoval mecbanism" to --D'Arsonval mechanism--.

Column 1, line 62, change "whicb" to --which--.

SUMMARY OF THE INVENTION:

Column 2, line 43, no new paragraph.

DESCRIPTION OF THE DRAWINGS:

Column 3, line 47, put a space between "3b" and "illustrates" and change "tbe" to --the--.

DETAILED DESCRIPTION OF THE INVENTION:

Column 4, line 10, after "cavity 23.", delete---.--.

Column 4, line 27, between "at" and "pole" insert --the--.

Column 4, line 52, change "the magnetic" to --this magnetic--.

UNITED STATES PATENT AND TRADEMARK OFFICE
CERTIFICATE OF CORRECTION

PATENT NO. : 4,774,458
DATED : September 27, 1988
INVENTOR(S) : Leonard S. Aronoff It is certified that error appears in the above-identified patent and that said Letters Patent is hereby corrected as shown below:

Column 5, line 52, between "cavity" and "but", insert --,--.

Column 6, indent lines 60 and 61.

Column 8, line 13, change "mean" to --means--.

Column 9, line 44, change "the cavity. This common polarity is (shown as North in" to --the cavity (this common polarity is shown as North in--.

Column 10, line 35, change "th" to --the--.

IN THE CLAIMS:

Column 13, line 66, change "2" to --8--.

Column 14, line 26, change "very" to --vary--.

Signed and Sealed this

Seventh Day of March, 1989

Attest:

DONALD J. QUIGG

Attesting Officer           Commissioner of Patents and Trademarks